Patented Feb. 1, 1938

2,106,812

UNITED STATES PATENT OFFICE 2,106,812

PROCESS OF XANTHATING CELLULOSE

George A. Richter and Harold P. Vannah, Berlin, N. H., assignors to Brown Company, Berlin, N. H., a corporation of Maine No Drawing. Application February 14, 1936, Serial No. 63,876

7 Claims. (Cl. 260—100)

This invention relates to a process of xanthating cellulose and more particularly to a process that involves mixing and reacting carbon bisulphide with a suspension of cellulose in aqueous caustic soda solution under conditions conducive to the formation of cellulose xanthate solution or viscose syrup of a character useful in the manufacture of artificial silk, films, and related end-products.

In producing cellulose xanthate solution by mixing and reacting in essentially a single continued operation all of the raw materials calculated as being necessary for a finished xanthate solution of a particular desired composition, it has been found that among those factors that importantly influence the rate and extent of the xanthating and dissolving reaction is the intimacy of contact brought about between the cellulose and the carbon bisulphide. Thus, thorough or vigorous mixing of the ingredients greatly promotes the xanthating and dissolving reaction so that in a given period of time a xanthate solution of greater freedom from unxanthated or residual cellulose is realized than would otherwise be the case.

In accordance with the present invention, the mixing and reacting of carbon bisulphide with a suspension of cellulose in aqueous caustic soda solution for the purpose of producing in essentially a single continued operation of cellulose xanthate solution or viscose syrup of the desired composition is performed in the presence of one or more emulsifying agents, such as soaps, tending to induce extremely fine particle emulsification of the carbon bisulphide in the caustic soda solution and, accordingly, the exposure of the suspended cellulose to a large aggregate reacting surface of carbon bisulphide, for we have found that such conditions are favorable to the desired reaction and that the resulting xanthate solution is freer not only from unreacted or residual cellulose but from microscopically fine gelatinous or incompletely dissolved particles. It is evidently the case that, on account of the presence of the emulsifying agent, the carbon bisulphide is resolved or dispersed into such extremely fine particles that they are capable of reacting upon and completely dissolving such fine particles of cellulose as are apt otherwise to escape complete xanthation or solution. The results attained by the practice of the present invention may perhaps be best appreciated from the fact that in the presence of only a very small amount of soap emulsifier it is possible readily to emulsify the liquid carbon bisulphide entering into the reaction as globules of an average particle size of about 4 to 2 microns or even finer.

When soap serves as the emulsifying agent herein, it is usually desirable to use it in such small amount that the caustic soda present in the reacting mixture or in the finished xanthate solution does not precipitate or salt-out the soap in substantial amount from solution. For the purpose of the present invention, only about 0.01 to 0.10% of soap, based on the weight of the reacting ingredients or the finished xanthate solution, need be used in order to realize the desired extremely fine particle size emulsification of the carbon bisulphide and at the same time to avoid noteworthy precipitation of soap from solution in producing cellulose xanthate solutions such as are customarily employed in artificial silk or film manufacture, for instance, cellulose xanthate solutions of a cellulose and caustic soda content each amounting to about 6% to 8% of the weight of the solution. The soap may be any one of the wide variety of water-soluble soaps effective as emulsifying agent for water-immiscible liquid, for instance, such soaps as the oleates, stearates, and palmitates whose fatty acid content has been combined with such alkalies or alkali-equivalents as caustic soda, caustic potash, ammonia, triethanolamine, or other amines. The soap may be added in fully prepared state to the mixed ingredients entering into the xanthating reaction or to any one of the ingredients; or soap-forming bodies, such as fatty acids or fatty acid glycerides, may be added in the same way as fully prepared soap, soap being formed in situ by the caustic soda available for saponification in the caustic soda solution constituting one of the reacting ingredients. Such fatty acids as oleic or such fatty acid glycerides as castor oil and cottonseed oil are typical of the soap-forming bodies that may serve to yield the small amount of soap emulsifier desired in the caustic soda solution.

A specific example of procedure accordant with the present invention may be carried out substantially as follows. Sheets of wood pulp or other suitable cellulose fiber, preferably of low solution viscosity, may be impregnated with oleic acid in the amount of about 1%, based on the weight of the dry fiber. The impregnation of the sheets or pulpboards with oleic acid may be effected either in the course of their fabrication on a papermaking machine or pulp drier or afterwards. Thus, they may be sprayed with oleic acid after delivery from the papermaking machine or pulp drier. The processing of the sheets to form cellulose xanthate solution may then be like that of application, Serial No. 58,539, filed January 10, 1936 by George A. Richter, in which case the sheets are cut into small pieces, for instance, pieces about ½" square, which are initially soaked in caustic soda solution and then disintegrated in the solution to form a fiber suspension substantially devoid of fiber aggregates, whereupon carbon bisulphide is added in appropriate amount to the fiber suspension and the mixed ingredients caused to react while being well mixed to yield the desired finished xanthate solution. Specifically, the small pieces or chips cut from the sheets or pulpboards may be added to a xanthating vessel or mixer along with caustic soda solution of 18% strength and in volume calculated to associate with the fiber or bone-dry cellulose an equal amount by weight of caustic soda. The pieces or chips may be permitted to soak in the mercerizing caustic soda solution at about 15° to 25° C. for about 30 minutes to 2 hours, at the end of which time they have been so softened and swollen by the mercerizing solution that they can be readily disintegrated or defiberized. At this time, water is added to the vessel or mixer to reduce the causticity of the caustic soda solution to about 10% and the mixer operated to agitate the soaked pieces or chips and thus to resolve them into the ultimate or individual fibers which, as they are released or liberated, become suspended in the caustic soda solution. While soaking and subsequent agitation of the pieces is taking place, their oleic acid content is saponified by caustic soda to yield sodium oleate. Agitation or mixing is continued until a thick, salvelike suspension of fibers substantially devoid of lumps or fiber aggregates is had, whereupon carbon bisulphide in the amount of about 40%, based on the dry weight of the cellulose, is added to such suspension and the mixed ingredients are subjected to continued agitation or mixing preferably at a temperature of about 15° to 20° C. Upon microscopic examination of a sample of the mixed reacting ingredients during the initial or early stage of their reaction, it is found that the carbon bisulphide has been emulsified in the caustic soda solution as globules of an average particle size of about 2 microns, whereas no such practically immediate emulsification of the carbon bisulphide takes place in the absence of soap. Excellent results, that is, globules of carbon bisulphide of an average size of about 2 microns or smaller, were had with especial ease through the use of only about 0.02% of ammonium oleate, based on the weight of the mixture. The addition of the ammonium oleate may be made to the salve-like suspension of fibers in caustic soda solution, that is, to the mass resulting after the chips have been soaked and disintegrated or defiberized but before the addition of carbon bisulphide. Of course, when ammonium oleate is thus added, there is no need of impregnating the sheets with oleic acid, as hereinbefore described. After about four hours' agitation or mixing of all of the ingredients, it is found that the xanthating reaction has gone substantially to completion as attested by the fact that the ingredients have been transformed into a clear solution such as is satisfactory for artificial silk and film manufacture. Diluting water may be added to the solution to adjust its cellulose and caustic soda content to about 7% each, which content is that ordinarily desired for artificial silk manufacture.

It is possible to depart in many respects from the illustrative procedure hereinbefore given. Thus, the oleic acid may be added to the carbon bisulphide or to the caustic soda solution rather than to the sheeted fiber; or it may be sprayed onto or otherwise incorporated into the sheet fragments or chips. Again, such soaps or soap-forming bodies as have hereinbefore been mentioned may be used in lieu or together with the oleic acid. Moreover, it is possible to use emulsifying agents other than soaps for the purpose of inducing the desired emulsification of the carbon bisulphide in the aqueous vehicle of the mixed reacting ingredients. Thus, various so-called wetting-out agents, including the sodium salt of naphthalene sulphonic acid with side chains and the sodium salt of octohydroanthracene metasulphonic acid, which are sold under the tradenames "Nekal BX" and "Nekal A", respectively, may be used as emulsifiers herein. Various powders of extremely fine or impalpable particle size are also serviceable as emulsifying agents for the carbon bisulphide; and they may be used alone or together with such other emulsifying agents as have already been mentioned. Titanium dioxide, zinc oxide, carbon, and other water-insoluble materials are available on the market as powders of extremely fine or colloidal particle size; and these materials are useful to best advantage in that they may not only serve as emulsifiers for the carbon bisulphide but to pigment and/or dull the luster of the artificial silk, films, or other end-products made from the viscose. Because of the chemical inertness of such powders with respect to the viscose-making ingredients and/or to the finished viscose solution, they may be added in much larger quantity than such emulsifying agents as the soaps. Powdered cellulose of extremely fine particle size behaves, so far as concerns emulsifying action on the carbon bisulphide, generally in the same way as the powders already mentioned, but it is, of course, consumed by reaction to form xanthate and is dissolved as part of the finished xanthate solution. Other pigments such as are prepared by precipitation methods and approach colloidal particle size may be used to emulsify the carbon bisulphide and to pigment or impart opacity to the end-product made from the viscose.

It is to be further understood that the present invention is not limited to the particular mode of producing xanthate solution disclosed in patent application, Serial No. 58,539, or to the use of particular kinds of cellulose fiber, or to the production of cellulose xanthate solution of particular cellulose content or causticity. Thus, it is possible to use as raw material cellulose fibers of various grades or characteristics, of various derivations, and in various physical forms, for instance: fibers of high solution viscosity as well as of low solution viscosity; ordinary sulphite, hardwood sulphite, or other chemical wood pulps; cotton fiber; wood pulps, including hardwood pulps, refined to high alpha cellulose content; pulp in fluffed or shredded form; etc.; and it is possible to produce solutions of greater or lower cellulose content and/or causticity than those ordinarily employed in artificial silk manufacture without departing from the spirit or scope of the invention as defined in the appended claims.

We claim:

1. A process of producing cellulose xanthate solution, which comprises admixing and agitating cellulose fibers with aqueous caustic soda solution in amount sufficient to yield a suspension of fibers substantially devoid of lumps or fiber aggregates in such caustic soda solution; and admixing with the resulting suspension of fibers in caustic soda solution carbon bisulphide in the presence of an emulsifying agent acting to induce at the early stage of mixing microscopically fine particle size emulsification of the carbon bisulphide in the caustic soda solution and thus to promote the xanthation of the cellulose fibers and the dissolution of the cellulose xanthate in the caustic soda solution.

2. A process of producing cellulose xanthate solution, which comprises admixing and agitating cellulose fibers with aqueous caustic soda solution in amount sufficient to yield a suspension of fibers substantially devoid of lumps or fiber aggregates in such caustic soda solution; and admixing with the resulting suspension of fibers in caustic soda solution carbon bisulphide in the presence of a water-soluble soap acting to induce at the early stage of mixing microscopically fine particle size emulsification of the carbon bisulphide in the caustic soda solution and thus to promote the xanthation of the cellulose fibers and the dissolution of the cellulose xanthate in the caustic soda solution.

3. A process of producing cellulose xanthate solution, which comprises admixing and agitating cellulose fibers with aqueous caustic soda solution in amount sufficient to yield a suspension of fibers substantially devoid of lumps or fiber aggregates in such caustic soda solution; and admixing with the resulting suspension of fibers in caustic soda solution carbon bisulphide in the presence of a water-soluble soap in such small amount as is not substantially precipitated by the caustic soda solution while acting to induce at the early stage of mixing microscopically fine particle size emulsification of the carbon bisulphide in the caustic soda solution and thus to promote the xanthation of the cellulose fibers and the dissolution of the cellulose xanthate in the caustic soda solution.

4. A process of producing cellulose xanthate solution, which comprises admixing and agitating cellulose fibers with aqueous caustic soda solution in amount sufficient to yield a suspension of fibers substantially devoid of lumps or fiber aggregates in such caustic soda solution; and admixing with the resulting suspension of fibers in caustic soda solution carbon bisulphide in the presence of extremely fine particle size powder insoluble in the carbon bisulphide and acting to induce at the early stage of mixing extremely fine particle size emulsification of the carbon bisulphide in the caustic soda solution and thus to promote the xanthation of the cellulose fibers and the dissolution of the cellulose xanthate in the caustic soda solution.

5. A process of producing cellulose xanthate solution, which comprises admixing and agitating cellulose fibers with aqueous caustic soda solution in amount sufficient to yield a suspension of fibers substantially devoid of lumps or fiber aggregates in such caustic soda solution; and admixing with the resulting suspension of fibers in caustic soda solution carbon bisulphide in the presence of water-insoluble, inert, impalpably fine pigment insoluble in the carbon bisulphide and acting to induce extremely fine particle size emulsification of the carbon bisulphide in the caustic soda solution and thus to promote the xanthation of the cellulose fibers and the dissolution of the cellulose xanthate in the caustic soda solution.

6. A process of producing cellulose xanthate solution, which comprises soaking chips of interfelted cellulose fibers with caustic soda solution of mercerizing strength to soften and swell them, adding water to the solution-soaked chips and disintegrating them to form a suspension of fibers substantially devoid of fiber aggregates or lumps in the resulting diluted caustic soda solution, and admixing with the resulting suspension of fibers in caustic soda solution carbon bisulphide in the presence of an emulsifying agent acting to induce at the early stage of mixing extremely fine particle size emulsification of the carbon bisulphide in the caustic soda solution and thus to promote the xanthation of the cellulose fibers and the dissolution of the cellulose xanthate in the caustic soda solution.

7. A process of producing cellulose xanthate solution, which comprises soaking chips of interfelted cellulose fibers with caustic soda solution of mercerizing strength to soften and swell them, adding water to the solution-soaked chips and disintegrating them to form a suspension of fibers substantially devoid of fiber aggregates or lumps in the resulting diluted caustic soda solution, and admixing with the resulting suspension of fibers in caustic soda solution carbon bisulphide in the presence of a water-soluble soap acting to induce at the early stage of mixing microscopically fine particle size emulsification of the carbon bisulphide in the caustic soda solution and thus to promote the xanthation of the cellulose fibers and the dissolution of the cellulose xanthate in the caustic soda solution.

GEORGE A. RICHTER.
HAROLD P. VANNAH.